(12) United States Patent
Rosenstein

(10) Patent No.: US 11,758,884 B1
(45) Date of Patent: Sep. 19, 2023

(54) HYGIENIC SELF-CLEANING ANIMAL DROPPING COLLECTION AND TRANSFER DEVICE

(71) Applicant: Jerry M. Rosenstein, Parkland, FL (US)

(72) Inventor: Jerry M. Rosenstein, Parkland, FL (US)

( * ) Notice: Subject to any disclaimer, the term of this patent is extended or adjusted under 35 U.S.C. 154(b) by 291 days.

(21) Appl. No.: 17/334,357

(22) Filed: May 28, 2021

Related U.S. Application Data

(60) Provisional application No. 63/031,311, filed on May 28, 2020.

(51) Int. Cl.
| | | |
|---|---|---|
| *E01H 1/10* | (2006.01) | |
| *A01K 23/00* | (2006.01) | |
| *E01H 1/12* | (2006.01) | |
| *B08B 3/02* | (2006.01) | |

(52) U.S. Cl.
CPC .............. *A01K 23/005* (2013.01); *B08B 3/02* (2013.01); *E01H 1/1206* (2013.01); *E01H 2001/1293* (2013.01)

(58) Field of Classification Search
CPC ...... A01K 23/005; A01K 27/004; A47L 13/52
USPC .................................................. 294/1.4, 1.5
See application file for complete search history.

(56) References Cited

U.S. PATENT DOCUMENTS

| | | | | |
|---|---|---|---|---|
| 953,756 | A * | 4/1910 | Olson | |
| 2,609,557 | A * | 9/1952 | Reed | A47L 13/22 |
| | | | | 401/47 |
| 3,744,453 | A * | 7/1973 | Deitch | A01K 23/005 |
| | | | | 294/1.5 |
| 4,042,269 | A * | 8/1977 | Skermetta | E01H 1/1206 |
| | | | | 15/257.3 |
| 4,262,948 | A * | 4/1981 | Emme | A01K 23/005 |
| | | | | 294/1.5 |
| 4,383,710 | A | 5/1983 | Fehr | |
| 4,641,873 | A * | 2/1987 | Nurnberger | E01H 1/1206 |
| | | | | 294/1.4 |
| 5,540,470 | A * | 7/1996 | Lu | E01H 1/1206 |
| | | | | 294/1.4 |
| 6,030,011 | A | 2/2000 | Layton | |

(Continued)

FOREIGN PATENT DOCUMENTS

| | | |
|---|---|---|
| CA | 2214317 | 4/1999 |
| JP | 2013132291 | 7/2013 |

*Primary Examiner* — Paul T Chin
(74) *Attorney, Agent, or Firm* — John Rizvi; John Rizvi, P.A.—The Patent Professor

(57) ABSTRACT

A hygienic self-cleaning animal dropping collection and transfer device to collect and transfer an animal's droppings includes a support assembly having a support member with a handle on one end. A collection assembly is mounted to a lower portion of the support member and has a collection tray dimensioned to be positioned under a rear portion of an animal to collect the animal's droppings thereon. A cover assembly includes a cover member which is disposable between an open collection orientation and a closed transfer orientation relative to the collection assembly. A dispenser assembly includes a reservoir containing an amount of a cleaning fluid mounted to a portion of the support assembly, the dispenser assembly having a dispenser nozzle operable to dispense an amount of the cleaning fluid onto the collection tray. An illumination assembly may be mounted to a portion of the device for use at night.

20 Claims, 11 Drawing Sheets

(56) References Cited

U.S. PATENT DOCUMENTS

| | | | |
|---|---|---|---|
| 6,077,362 A | 6/2000 | Reed | |
| 6,732,402 B1 * | 5/2004 | Hsu | A47L 13/52 |
| | | | D32/74 |
| 6,942,264 B1 | 9/2005 | Mendez | |
| 7,431,361 B2 | 10/2008 | Pilas | |
| 7,631,910 B2 | 12/2009 | Shalhoub | |
| 7,703,170 B2 * | 4/2010 | Orubor | E01H 1/0827 |
| | | | 15/322 |
| 8,066,311 B2 | 11/2011 | Axelrod | |
| D663,906 S * | 7/2012 | Pallant | D30/162 |
| 8,550,512 B2 | 10/2013 | Jones, Jr. | |
| 10,212,920 B1 * | 2/2019 | Schlitt | A01K 23/005 |
| 11,459,715 B2 * | 10/2022 | Benton | E01H 1/1206 |
| 2005/0236851 A1 * | 10/2005 | Maginness | E01H 1/006 |
| | | | 294/1.3 |
| 2006/0012195 A1 | 1/2006 | Scala | |
| 2009/0058114 A1 | 3/2009 | Diehl | |

\* cited by examiner

HYGIENIC SELF-CLEANING ANIMAL DROPPING COLLECTION AND TRANSFER DEVICE

CROSS-REFERENCE TO RELATED APPLICATIONS

This application claims the benefit of U.S. Provisional Patent Application Ser. No. 63/031,311 filed on May 28, 2020, which is incorporated by reference herein in its entirety.

FIELD OF THE INVENTION

The present invention relates generally to a hygienic self-cleaning animal dropping collection and transfer device which may be used while caring for an animal, such as a pet dog, to allow a user to collect an animal's droppings as it occurs, transfer the droppings to a final disposal location, and clean the device after use, all without requiring a user to bend down and/or pick up the animal droppings to place them into a plastic bag or other container for disposal, or to touch the collection assembly of the device with one's hands during transfer or cleaning.

BACKGROUND OF THE INVENTION

It has long been said that a dog is a man's best friend. In the United States today, there are an estimated 80 to 90 million dogs kept as pets, or about one pet dog for every family in the country today. As the population of the country becomes more and more concentrated in large urban areas, the concentration of dogs in those areas is rapidly increasing as well. Clearly American's love their dogs, and they take great strides to care for them.

This care begins at the very earliest stages in a dog's life, and in particular for dogs who are raised to be indoors for any extent of time. More in particular, among the first experiences in most indoor dogs' lives is its owner or other caretaker undertaking the task of housebreaking. Housebreaking consists basically of teaching a puppy, at first, to only relieve itself in a certain area of the home, such as on a layer of old newspapers or a specially designed potty training pad. In some cases, spray scents are utilized to entice the puppy to the designated area to relieve itself.

Ultimately, the goal of housebreaking is to teach the puppy not to relieve itself indoors in the home at all, but rather to wait for its owner or caretaker to take it for a walk to get some exercise and, more importantly, to allow the puppy or dog to relieve itself outdoors. As one can imagine, millions of dogs relieving themselves on the streets, sidewalks, and tree lawns, such as exist in urban areas across the country, on a daily basis creates an unpleasant aesthetic nuisance, and more importantly, it creates a public health concern. Therein lies the crux of the problem with American's love affair with dogs.

In response to the continually increasing number of dogs being kept by their residents, most urban municipalities have passed law which require pet owners, such as dog owners, to pick up after their pets when they relieve themselves in public places, once again, such as streets, sidewalks, and tree lawns. To facilitate compliance with this requirement, waste disposal receptacles specifically designated for the disposal of pet feces are now strategically stationed throughout our cities and suburbs, as well as in designated "doggy parks."

It is an all too common sight today to see men and women, often nicely dressed for work or perhaps an evening out, walking his or her dog in a public space with the now ubiquitous green plastic bag in his or her hand. It is also common to see these same men and women bending down and picking up the fresh droppings from their pet or pets with nothing more than a thin plastic bag between the freshly deposited feces and their hands. This awkward and rather embarrassing event occurs millions of times daily across the country. To make matters worse, millions upon millions of the ubiquitous green plastic bags and tons of pet feces are now being thrown into the specifically designated waste receptacles around the country, and around the world on a daily basis.

A number of devices have been developed in attempts to facilitate the capture and/or collection of pet feces from public, as well as private, areas for transport to a final disposal location. These devices range from a simple open scoop on a post. Some include a rake like tool to scrape feces into the scoop after a dog has relieved itself. Other devices include a clam shell like structure to pick up feces without the need for a separate rake structure. One device includes a net like structure which must be balanced and maintained in position under a dog as it relieves itself in an attempt to catch the feces before it hits the ground. Once collected via one of these types of devices, the feces are often disposed of in the specifically designated disposal receptacles, often requiring the user to scrape or otherwise assist displacement of the feces from the device. One attempt to address this issue is a device which incorporates a mechanism to rinse an open scoop which is coated with a low friction polymeric to facilitate removal of the feces collected thereon. Of course, utilization of these known devices does not eliminate the tons of pet waste generated daily and disposed of in the specifically designated disposal receptacles, which must ultimately be disposed of properly. The U.S. Environmental Protection Agency has issued a Source Water Protection Practices Bulletin entitled "Managing Pet and Wildlife Waste to Prevent Contamination of Drinking Water," wherein a recommended method of disposing of pet waste is by flushing down a toilet so that it may be "properly treated by a community sewage plant or septic system."

As will also be appreciated, each of those devices should be thoroughly cleaned after use, preferably after each use, which may require cleaning two, three, or more times per day. As becomes clear, in addition to the amount of time required to walk and exercise one's pet dog or dogs on a daily basis, a considerable amount of time may be consumed by cleaning up the aforementioned devices afterwards. These factors could prevent people which might otherwise enjoy and even benefit from the companionship of a dog from having one, simply because of the added burden of collecting and disposing of the pet's waste.

Accordingly, there is an established need for a device which allows a user to collect an animal's droppings, such as a dog's feces, as it occurs, and to securely transfer the droppings to a final disposal location. A further need exists for a device that is self-cleaning so as to minimize the time required to collect and properly dispose of animal droppings. A further benefit may be realized by providing a device which completely eliminates the need for a user to bend down and/or pick up the animal droppings to place them into a plastic bag or other such container for disposal. It would also be helpful to provide a device which eliminates the need for a user to touch any portion of the device contacted by animal droppings during transfer of the animal droppings or during cleaning of the device.

SUMMARY OF THE INVENTION

The present invention is directed to a hygienic self-cleaning animal dropping collection and transfer device to collect and transfer an animal's droppings without requiring a user to bend down and/or pick up the animal droppings to place them into a plastic bag or other container for disposal. In one embodiment, the present device includes a support assembly having a support member with a handle disposed on one end to facilitate positioning the device in an operative position under a rear portion of an animal during use. A hygienic self-cleaning animal dropping collection and transfer device in accordance with one further embodiment of the present invention comprises a collection assembly mounted to a lower portion of the support member. A collection assembly of the present device includes a collection tray with an open end along at least one side, wherein the collection tray is dimensioned to be positioned under a rear portion of the animal to collect the animal's droppings thereon. A hygienic self-cleaning animal dropping collection and transfer device in accordance with at least one embodiment of the present invention further comprises a cover assembly having a cover member disposable between an open collection orientation and a closed transfer orientation relative to the collection assembly. A dispenser assembly having a reservoir mounted to the support assembly for containing an amount of a cleaning fluid is provided in one further embodiment, wherein the dispenser assembly further comprises a dispenser nozzle operable to dispense an amount of the cleaning fluid from said reservoir onto said collection tray of said collection assembly. In at least one embodiment, the cleaning fluid comprises a slippery or lubricious fluid, so as to minimize adhesion of the animal droppings to the collection tray, for ease of disposal of the animal droppings therefrom.

In a first implementation of the invention, a hygienic self-cleaning animal dropping collection and transfer device may comprise a positioning assembly which is structured and disposed to facilitate disposition of a cover member between an open collection orientation and a closed transfer orientation relative to the collection assembly.

In a second aspect, a positioning assembly can include an actuator which is movable along a portion of support assembly, the actuator operable to dispose the cover member between the open collection orientation and the closed transfer orientation.

In a third aspect, a support assembly may have a foot disposed opposite the handle to facilitate maintaining the device in an operative position under a rear portion of an animal during use.

In fourth aspect, a collection tray may be constructed of stainless steel, and in one further aspect, the collection assembly can comprise mirror polished stainless steel.

In another aspect, a dispensing assembly can include a reservoir mount such that the reservoir may be securely affixed in an operative disposition to a portion of the support assembly.

In still a further aspect, a dispenser assembly may be operable to dispense an amount of a cleaning fluid from a reservoir onto at least a portion of a collection assembly upon operation of a trigger.

In another aspect, a collection assembly can include a back wall having a back slot therethrough wherein the back slot is dimensioned and configured such that at least a portion of a dispenser nozzle is operatively positioned therethrough.

In one other aspect, a collection assembly may include sidewalls each having a sloped edge adjacent an open end thereof.

In yet another aspect, a cover assembly includes a sloped portion cooperatively structured to substantially align with sloped edges of the collection assembly such that while the cover member is disposed in a closed transfer orientation, an open end of the collection assembly is substantially enclosed thereby securely retaining the animal droppings for transfer to a final disposal location, such as a toilet, a composter for non-edible gardening, etc.

In still one further aspect, a cover member can have a cover slot dimensioned and disposed such that at least a portion of a dispenser nozzle is operatively positioned therethrough while the cover member is disposed in an open collection orientation.

These and other objects, features, and advantages of the present invention will become more readily apparent from the attached drawings and the detailed description of the embodiments, which follow.

BRIEF DESCRIPTION OF THE DRAWINGS

The embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a hygienic self-cleaning animal dropping collection and transfer device to collect an animal's droppings as it occurs, transfer the droppings to a final disposal location, and clean the device after use, all without requiring a user to bend down and/or pick up the animal droppings to place them into a plastic bag or other container for disposal, or to touch the collection assembly of the device with one's hands during transfer or cleaning.

Figure 1:
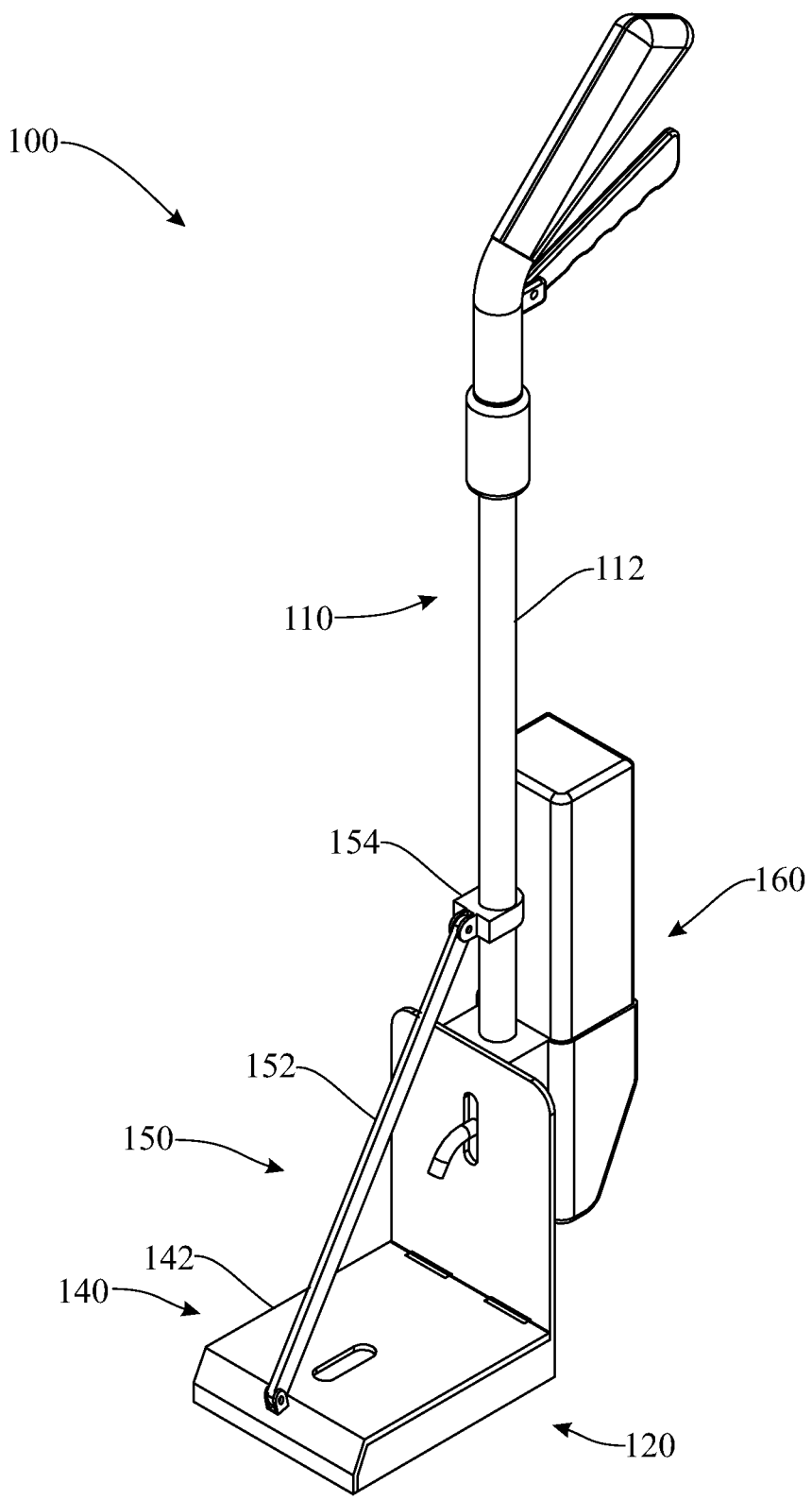
FIG. 1 presents a front perspective view of one illustrative embodiment of a hygienic self-cleaning animal dropping collection and transfer device showing a cover assembly disposed in a closed transfer configuration, in accordance with the present invention.
Figure 2:
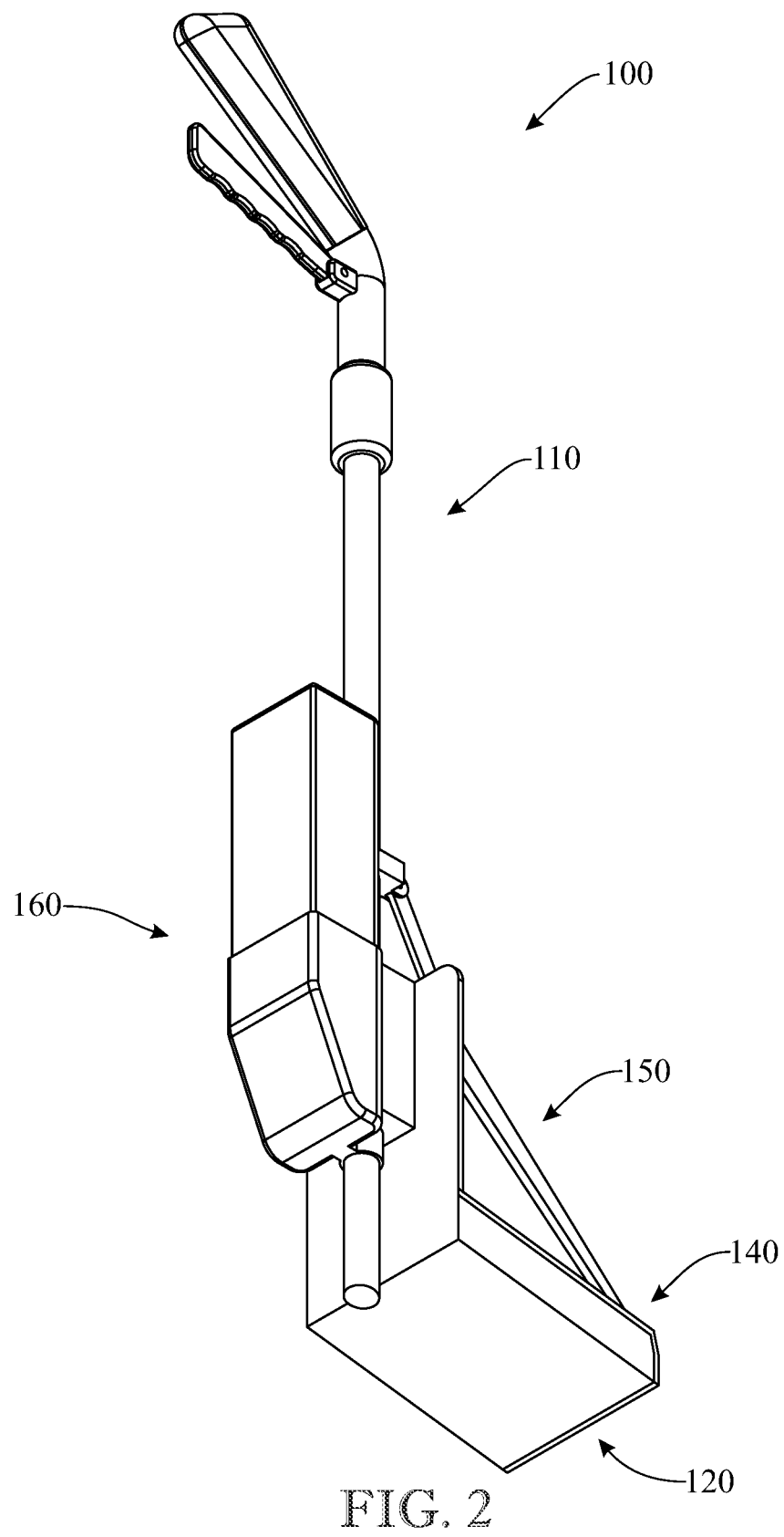
FIG. 2 presents a rear perspective view of the illustrative embodiment of the hygienic self-cleaning animal dropping collection and transfer device of FIG. 1, in accordance with the present invention.

Referring initially to the illustrative embodiment of FIGS. 1 and 2, front and rear perspective views of a hygienic self-cleaning animal dropping collection and transfer device 100, respectively, in accordance with the present invention are presented. As shown in the figures, the present device 100 includes a support assembly 110 onto which the various components which comprise the device 100 are cooperatively mounted.

Figure 4:
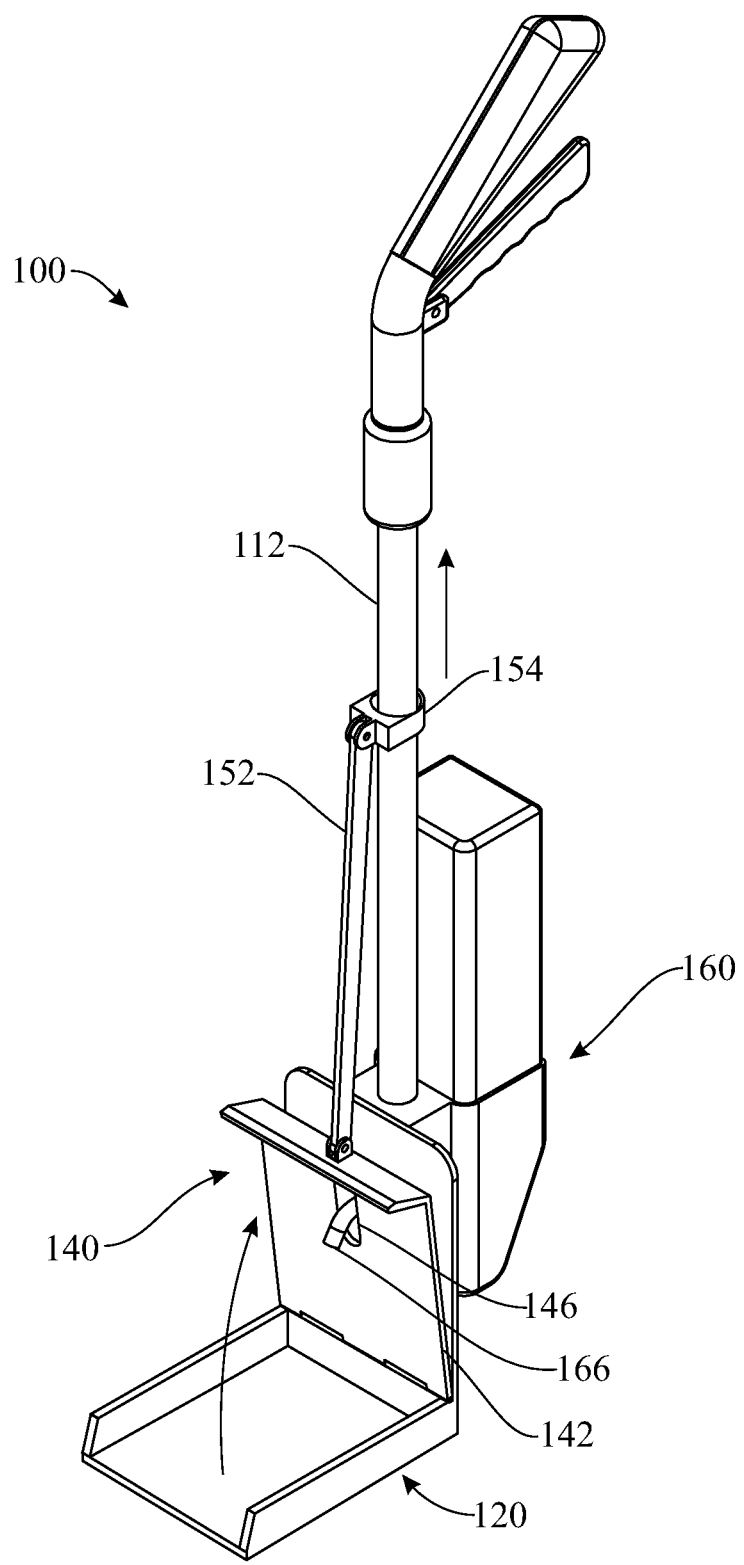
FIG. 4 presents a front perspective view of the illustrative embodiment of the hygienic self-cleaning animal dropping collection and transfer device of FIG. 1 showing a cover assembly disposed in an open collection configuration, in accordance with the present invention.

More in particular, and with continued reference to the illustrative embodiment of FIGS. 1 and 2, a hygienic self-cleaning animal dropping collection and transfer device 100 includes a collection assembly 120 positioned at a lower portion thereof. As further shown in the figures, the present device 100 includes a cover assembly 140 which is movable relative to at least a portion of the collection assembly 120. A cover assembly 140 in accordance with at least one embodiment of the present invention includes a cover member 142 disposable between an open collection orientation, as shown in FIG. 4, and a closed transfer orientation, as shown in FIG. 1, and as discussed in further detail below. As may also be seen from the illustrative embodiment of FIGS. 1 and 2, a hygienic self-cleaning animal dropping collection and transfer device 100 in accordance with the present invention includes a positioning assembly 150. A positioning assembly 150 is provided to facilitate disposition of the cover assembly 140 between an open collection orientation and a closed transfer orientation, once again, as is discussed in greater detail hereinafter.

A hygienic self-cleaning animal dropping collection and transfer device 100 in accordance with the present invention further comprises a dispenser assembly 160, as is further shown in the illustrative embodiment of FIGS. 1 and 2. In at least one embodiment, a dispenser assembly 160 is operable to dispense an amount of a cleaning fluid onto at least a portion of the collection assembly 120.

Figure 3:
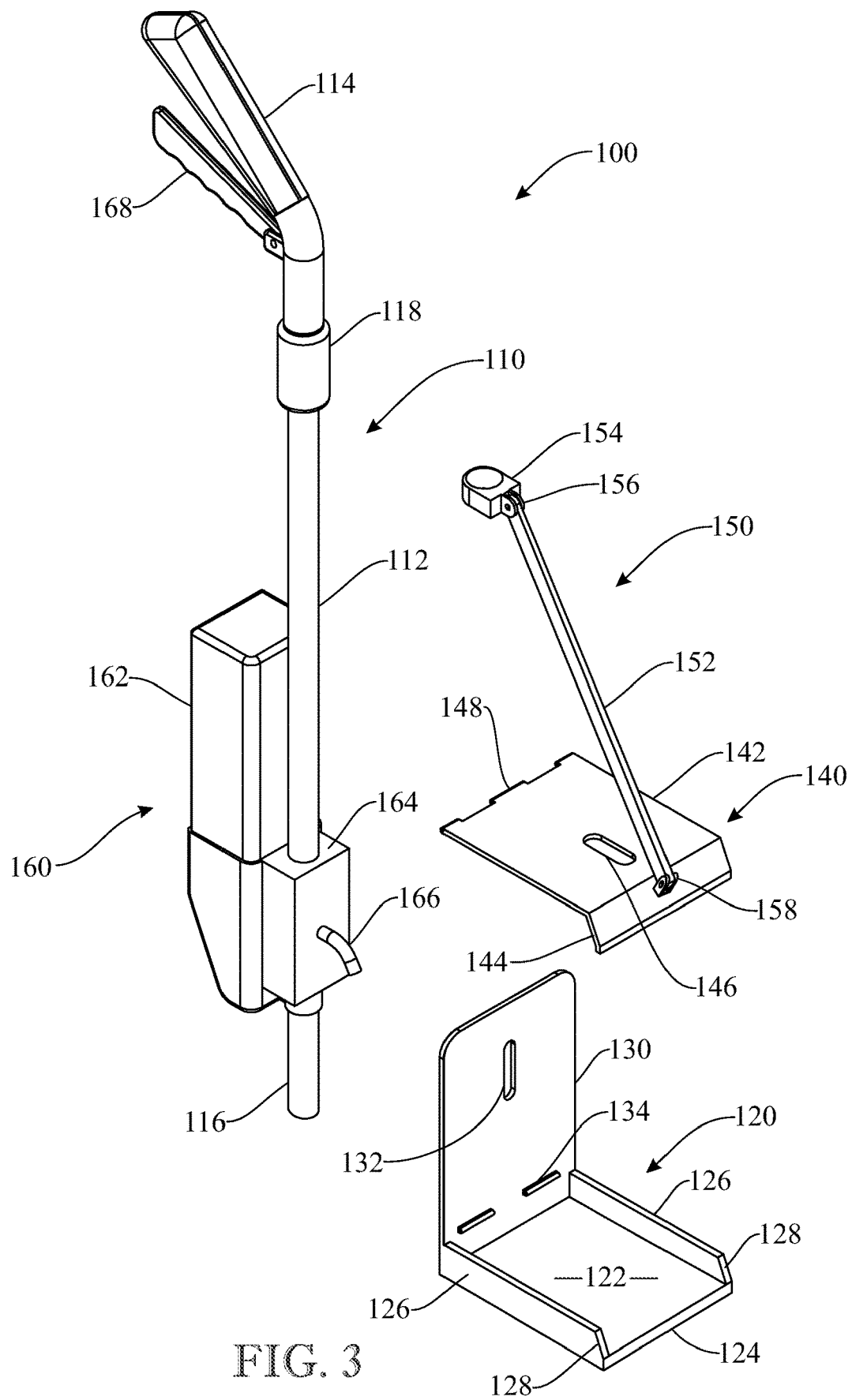
FIG. 3 presents a partially exploded front perspective view of the illustrative embodiment of the hygienic self-cleaning animal dropping collection and transfer device of FIG. 1 showing a support assembly, a collection assembly, a cover assembly, a positioning assembly, and a dispenser assembly, in accordance with the present invention.

Turning next to FIG. 3, a partially exploded perspective view of a hygienic self-cleaning animal dropping collection and transfer device 100 in accordance with at least one embodiment of the present invention is shown. As before, the device 100 comprises support assembly 110 onto which the various components of the device 100 are cooperatively mounted. The support assembly 110 includes a support member 112. As may be seen from FIG. 3, in at least one embodiment, a support member 112 comprises an elongated configuration. The support member 112 is constructed of any material having sufficient strength and rigidity to support the various components of the device 100 thereon such as metal, metal alloy, plastic, fiberglass, etc., just to name a few. As further shown in FIG. 3, the support assembly 110 includes a handle 114 disposed on one end thereof, wherein the handle 114 is dimensioned and configured to facilitate operative positioning of the present hygienic self-cleaning animal dropping collection and transfer device 100 under the rear portion of an animal while in operation, without disturbing the animal. In at least one embodiment, a support assembly 110 further comprises a grip 118 which allows a user to transport the device 100 into and out of a storage location. As will be appreciated, a grip 118 in accordance with the present invention may comprise any of a plurality of materials of construction such as foam, memory foam, rubber, plastic, etc.

Figure 7:
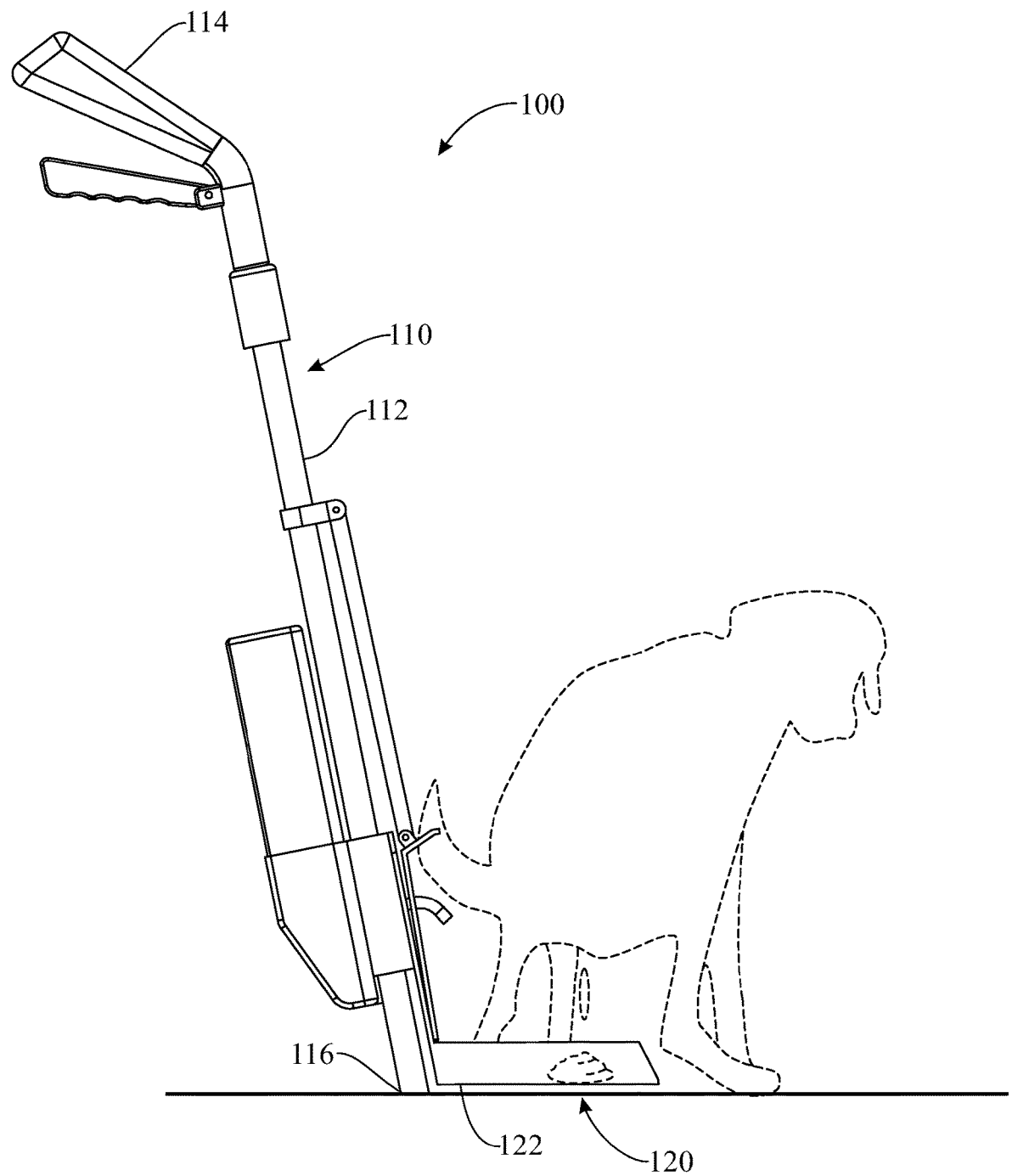
FIG. 7 is a side elevation of the illustrative embodiment of the hygienic self-cleaning animal dropping collection and transfer device of FIG. 1 showing the device capturing an animal's droppings, in accordance with the present invention.

In at least one embodiment, such as is shown in FIG. 3, a support assembly 110 further comprises a foot 116 disposed on an end of the support member 112 opposite the handle 114. The foot 116 of the support assembly 110 is provided to further facilitate operative positioning of the present hygienic self-cleaning animal dropping collection and transfer device 100 by a user while in operation. More particular, and as is shown best in FIG. 7, the foot 116 of the support assembly 110 extends slightly below and beyond the bottom of the collection tray 122 of the collection assembly 120. Thus, while the present device 100 is disposed in an open collection orientation under a rear portion of an animal, such as a dog as shown in FIG. 7, a user applies a slight downward pressure to the support member 112 via handle 114, such that the foot 116 grips the underlying surface sufficiently to prevent movement of the device 100 and to avoid disturbing the animal which may result in its droppings being left on the ground rather than on the collection tray 122 of the collection assembly 120.

Looking again to the illustrative embodiment of FIG. 3, and as noted above, a hygienic self-contained animal dropping collection and transfer device 100 in accordance with the present invention includes a collection assembly 120. As shown in FIG. 3, a collection assembly 120 includes a collection tray 122 positioned along the lower portion thereof. The collection assembly 120 has an open end 124 extending along one side of the collection tray 122. Further, and as shown best in the illustrative embodiment of FIG. 3, the collection assembly 120 further comprises a back wall 130 affixed along another side of the collection tray 122, opposite the open and 124. In at least one embodiment, a back wall 130 extends upwardly from a collection tray 122 to form an included angle of at least about 110 degrees with the collection tray 122 in order to provide clearance between the device 100 and the animal, such as is best shown in FIG. 7. A back wall 130 in accordance with the present invention may include a cover interconnect 134 to facilitate secure yet movable attachment of a portion of a cover assembly 140 thereto, as described in greater detail below.

With continued reference to the illustrative embodiment of FIG. 3, the collection assembly 120 further comprises sidewalls 126 which extend along opposite sides of the collection tray 122 extending from the back wall 130 to the open end 124. Importantly, each sidewall 126 comprises a sloped edge 128 which extends upward and rearward from the open end 124 of the collection tray 122, as shown in FIG. 3.

A collection assembly 120 in accordance with the present invention may be constructed from any of a variety of materials having sufficient rigidity and strength to collect and transfer animal droppings for ultimate disposal without deformation or failure. Further, a collection assembly 120, and at least a collection tray 122, is constructed of a material having a low coefficient of friction to facilitate the transfer of animal droppings collected thereon. In one embodiment, a collection assembly 120 may be constructed of a metal or metal alloy such as aluminum, tin, steel, etc. In another embodiment, the collection assembly 120 may be constructed of fiberglass, plastic or similar engineered plastic materials. In at least one embodiment, a collection assembly 120 is constructed of a mirror polished stainless steel which exhibits the necessary rigidity, strength, and corrosion resistance, as well as having a sufficiently low coefficient of friction to allow animal droppings to be easily released therefrom for disposal, such as into a toilet, composter, once again, for non-edible gardening, etc. As will be appreciated, given the additional expense of mirror polished stainless steel, in at least one embodiment the collection tray 122 of the collection assembly 120 is constructed of a mirror polished stainless steel, while the remainder of the collection assembly 120 is constructed of other compatible, yet less expensive materials of construction. In at least one further embodiment, the collection tray 122 of the collection assembly 120 is constructed of a mirror polished stainless steel having a coefficient of friction which is low enough such that the animal droppings will simply slide off of the collection tray 122 for disposal on their own, without the need for any lubricious cleaning fluid. Therefore, in such an embodiment, a hygienic self-cleaning animal dropping collection and transfer device 100 in accordance with the present invention consists solely of a support assembly 110, a collection assembly 120, a cover assembly 140 and a positioning assembly 150, without the need of a dispenser assembly 160 to dispense cleaning fluid onto the collection tray 122.

With reference once again to the illustrative embodiment of FIG. 3, a hygienic self-cleaning animal dropping collection and transfer device 100 in accordance with the present invention further comprises a cover assembly 140. A cover assembly 140 in accordance with the present invention comprises a cover member 142 which is disposable between an open collection orientation and a closed transfer orientation relative to the collection assembly 120 of the present device 100. In at least one embodiment, a cover member 142 includes an interconnect 148 to movably yet securely attach a portion of the cover member 142 to a portion of the collection assembly 120. More in particular, and as may be seen best from the illustrative embodiment of FIG. 3, the cover member 142 comprises an interconnect 148 cooperatively structured with cover interconnect 134 disposed on the back wall 130 of the collection assembly 120 to form a movable hinge about which the cover member 142 is pivotable relative to the back wall 130 and the collection assembly 120.

More in particular, in at least one embodiment a cover member 142 comprises a sloped portion 144 along one end thereof, as shown best in FIG. 3. As will be appreciated from the figures, the sloped portion 144 of the cover member 142 is cooperatively structured to substantially align with the sloped edges 128 of the collection assembly 120, as may be seen in FIG. 1. Thus, it will be appreciated that while the cover member 142 is disposed in a closed transfer orientation relative to the collection assembly 120, the open end 124 of the collection assembly 120 is substantially enclosed thereby securely retaining the animal droppings collected in the collection assembly 120 for transfer to a final disposal location, such as a toilet, composter, etc.

As with a collection assembly 120, a cover assembly 140 in accordance with the present invention may be constructed from any of a variety of materials having sufficient rigidity and strength to enclose and transfer animal droppings for ultimate disposal without deformation or failure. Further, a cover assembly 140 may be constructed of a material having a low coefficient of friction to facilitate cleaning thereof after the transfer of animal droppings enclosed thereunder. As such, in one embodiment, a cover assembly 140 is constructed of a metal or metal alloy such as aluminum, tin, steel, etc. In another embodiment, the cover assembly 140, or components thereof, are constructed of fiberglass, plastic or similar engineered plastic materials, to reduce the overall cost and weight of the present device 100.

Looking further to the illustrative embodiment of FIG. 3, a hygienic self-cleaning animal dropping collection and transfer device 100 comprises a positioning assembly 150 as noted above. A positioning assembly 150 includes a positioning member 152 interconnected to at least a portion of a cover assembly 140 to facilitate disposition of a cover member 142 from an open collection orientation to a closed transfer orientation. In at least one embodiment, a positioning assembly 150 further comprises an actuator 154 mounted to one end of a positioning member 152. As may be seen best from FIG. 3, an actuator 154 is movably interconnected to one end of the positioning member 152 via an actuator interconnect 156. As further shown in FIG. 3, the positioning assembly 150 further comprises a cover interconnect 158 which is movably interconnected to an end of the positioning member 152 opposite the actuator 154.

With reference to the illustrative embodiment of FIGS. 1 and 4, the actuator 154 of the positioning assembly 150 is movably disposable along a portion of the support member 112 of the support assembly 110. Looking first to FIG. 1, moving the actuator 154 of the positioning assembly 150 towards a lower end of the support member 112 causes the positioning member 152 to pivot outwardly from the support member 112 thus positioning cover member 142 of the cover assembly 140 into a closed transfer orientation relative to the collection assembly 120.

Figure 6:
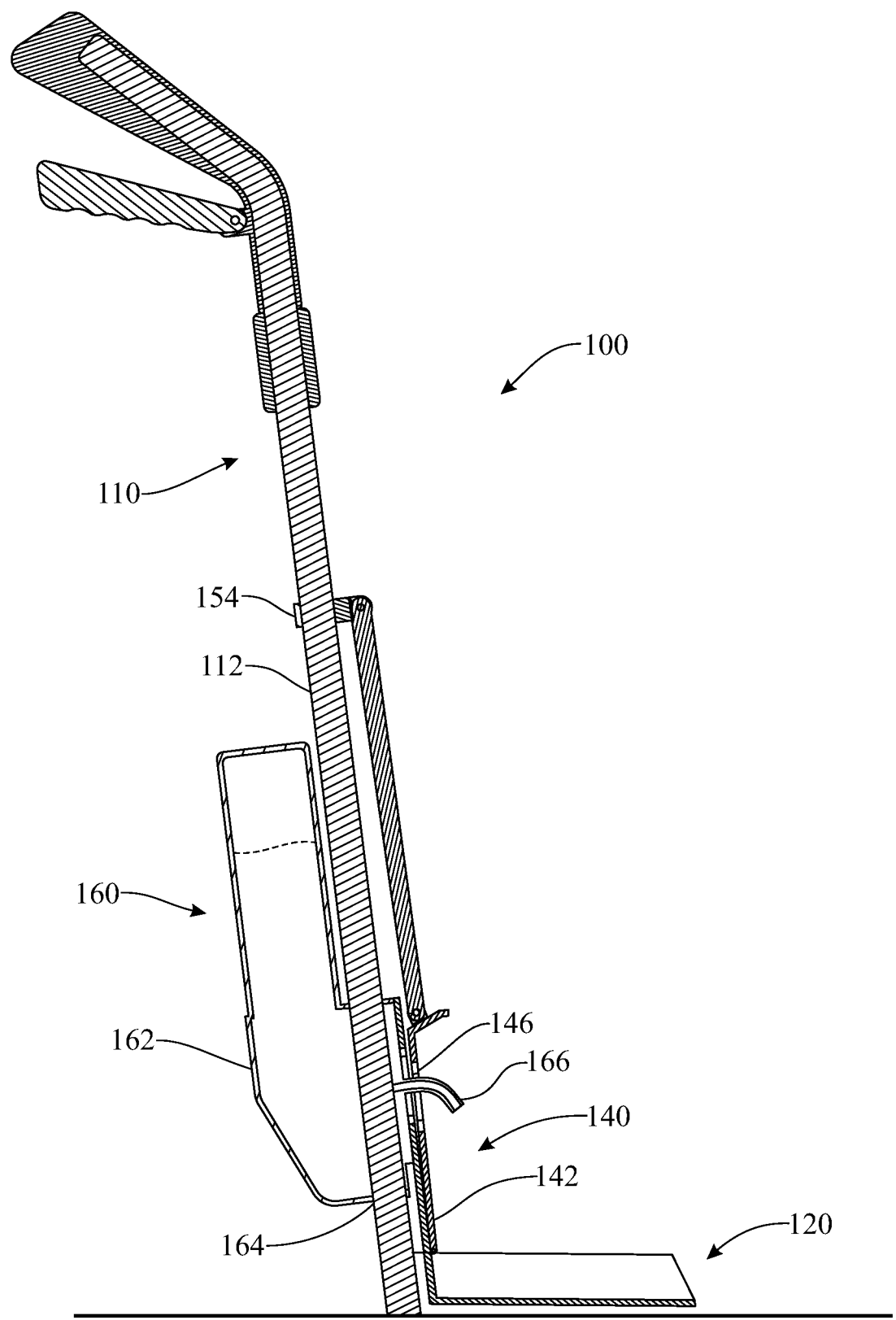
FIG. 6 is a cross-section through a side elevation of the illustrative embodiment of the hygienic self-cleaning animal dropping collection and transfer device of FIG. 1, in accordance with the present invention.

Turning next to FIG. 4, moving the actuator 154 of the positioning assembly 150 upwardly along the support member 112, as shown by the upwardly pointing directional arrow, causes the positioning member 152 to pivot inwardly towards the support member 112 thus pivoting the cover member 142 of the cover assembly 140 into an open collection orientation relative to the collection assembly 120 about the cover interconnect 134, as shown by the curved directional arrow in FIG. 4. As shown throughout the figures, the actuator 154 is disposed in a sliding operative engagement with the support member 112, as shown best in FIG. 6, such that moving the actuator 154 upward or downward along the support member 112 results in movement of the cover member 142 towards open or closed orientations, respectively. In at least one embodiment, the actuator 154 is operable by the user simply grasping the actuator 154 and sliding it upward or downward along the support member 112. It will be appreciated, however, that the actuator 154 may be moved upwards or downwards along the support member 112 by any of a variety of mechanical means such as a pulley system, electrical motor and gear arrangement, which may be powered by a battery, solar, etc., just to name a few.

The present hygienic self-cleaning animal dropping collection and transfer device 100 further comprises a dispenser assembly 160, as noted above. Returning once again to the illustrative embodiment of FIG. 3, the dispenser assembly 160 includes a reservoir 162 dimensioned and disposed to contain a cleaning fluid therein. As will be appreciated, any of a variety of cleaning fluids may be utilized with the device 100 of the present invention including, but in no manner limited to, a concentrated liquid soap or detergent, a dilute liquid soap or detergent, an antibacterial soap or detergent, or simply plain water. As before, in at least one embodiment, the cleaning fluid comprises a slippery or lubricious fluid, so as to minimize adhesion of the animal droppings to the collection tray 122, for ease of disposal of the animal droppings therefrom. In accordance with at least one embodiment of the present invention, a reservoir 162 of a dispenser assembly 160 may be constructed of metal or metal alloy, engineered plastics, fiberglass, or other such fluid tight materials which are substantially inert to the cleaning fluid to be contained therein. In at least one embodiment, the dispenser assembly 160, or components thereof, are constructed of fiberglass, plastic or similar engineered plastic materials, to reduce the overall cost and weight of the present device 100.

A dispenser assembly 160 in accordance with the present invention also includes a reservoir mount 164 such that the reservoir 162 may be securely affixed in an operative disposition to a portion of the support assembly 110. The reservoir mount 164 in accordance with the present embodiment may securely affix the reservoir 162 to the portion of the support member 112 by any of a variety of fastening mechanisms such as a friction fit, adhesive, or mechanical securing collars positioned below or above and below the reservoir mount 164 along the portion of the support member 112. In at least one embodiment, a dispenser assembly 160 in accordance with the present invention includes a top shell and a plurality of side shells, each of which is formed of molded plastic or similar material, wherein the top and side shells are configured to interlock and be retained together, such as by mechanical fasteners, thereby forming a reservoir mount/pump chamber 164. In at least one further embodiment, a reservoir mount/pump chamber 164 is configured to be mounted to at least a portion of a support member 112 of the support assembly 110 and to be securely affixed thereto, such as, by way of example only, by mechanical fasteners. A reservoir mount/pump chamber 164, in accordance with the present invention, securely receives a reservoir 162 in a releasable snap-fit relation, to allow for easy removal of the reservoir 162 for refilling and/or replacement of the cleaning fluid therein.

The dispenser assembly 160 of the present hygienic self-cleaning animal dropping collection and transfer device 100 further comprises a dispenser nozzle 166. As seen best in the illustrative embodiment of FIG. 1, the back wall 130 of collection assembly 120 comprises a back slot 132 through which the dispenser nozzle 166 is disposed into an operative position relative to the collector assembly 120. Looking next to the illustrative embodiment of FIGS. 4 and 6, the cover member 142 of the cover assembly 140 comprises a cover slot 146 which is dimensioned and disposed such that the dispenser nozzle 166 of the dispenser assembly 160 passes therethrough when the cover member 142 is disposed in an open collection orientation relative to collection assembly 120.

Figure 5:
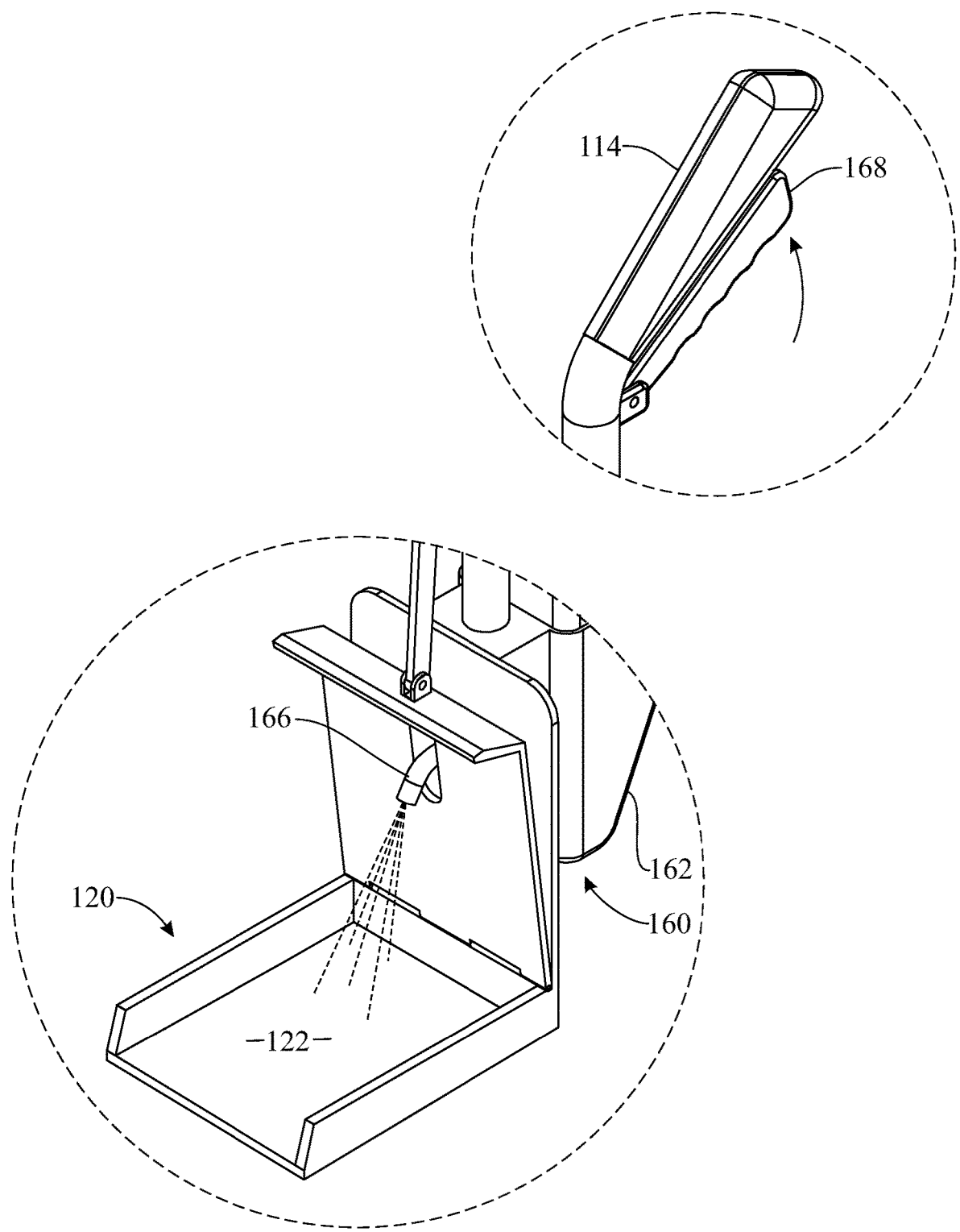
FIG. 5 presents a partial perspective view of the illustrative embodiment of the hygienic self-cleaning animal dropping collection and transfer device of FIG. 1 showing a dispenser nozzle dispensing an amount of a cleaning fluid onto a portion of a collection assembly, in accordance with the present invention.

In at least one embodiment, a dispenser nozzle 166 of a dispenser assembly 160 is operable to dispense an amount of a cleaning fluid from a reservoir 162 onto at least a portion of a collection assembly 120 upon operation of a trigger 168, such as may be seen in the illustrative embodiment of FIG. 5. More in particular, upon operation of a trigger 168 of the dispenser assembly 160, such as by squeezing the trigger 168 upwardly toward handle 114, an amount of cleaning fluid is discharged from the reservoir 162 through the dispenser nozzle 166 and onto the collection tray 122 of the collection assembly 120, once again, as shown in the illustrative embodiment of FIG. 5

In operation, an amount of cleaning fluid is discharged onto the collection tray 122 of the collection assembly 120, just prior to the collection of animal droppings thereon, to facilitate transfer of the animal droppings from the device 100 into a final disposal location, once again, such as a toilet, a composter for non-edible gardening, etc. An amount of water may be poured onto the collection tray 122, such as from a bottle, to assist in displacement of the animal dropping from the collection tray 122 and into a final disposal location. Further, an amount of cleaning fluid may be discharged onto the collection tray 122 after collection and transfer of animal droppings therefrom so as to clean and/or disinfect the collection tray 122 of the collection assembly 120. An amount of water may be poured onto the collection tray 122 after use so as to rinse away any residual cleaning fluid before it dries onto the surface of the collection tray 122. As will be appreciated, in some instances it may be desirable to rinse portions of the collection assembly 120 and/or the cover assembly 140 after one or more use, and prior to storage of the same.

Further embodiments are contemplated in addition to the embodiments shown and/or described herein. For example, FIGS. 8 through 11 present one further illustrative embodiment of a hygienic self-cleaning animal dropping collection and transfer device 100 having an illumination assembly 170 operatively mounted thereto. As before, and as shown in FIGS. 8 through 11, this further embodiment of the present invention is also directed toward a hygienic self-cleaning animal dropping collection and transfer device 100 to collect an animal's droppings as it occurs, transfer the droppings to a final disposal location, and clean the device after use, all without requiring a user to bend down and/or pick up the animal droppings to place them into a plastic bag or other container for disposal, or to touch the collection assembly of the device with one's hands during transfer or cleaning.

Figure 8:
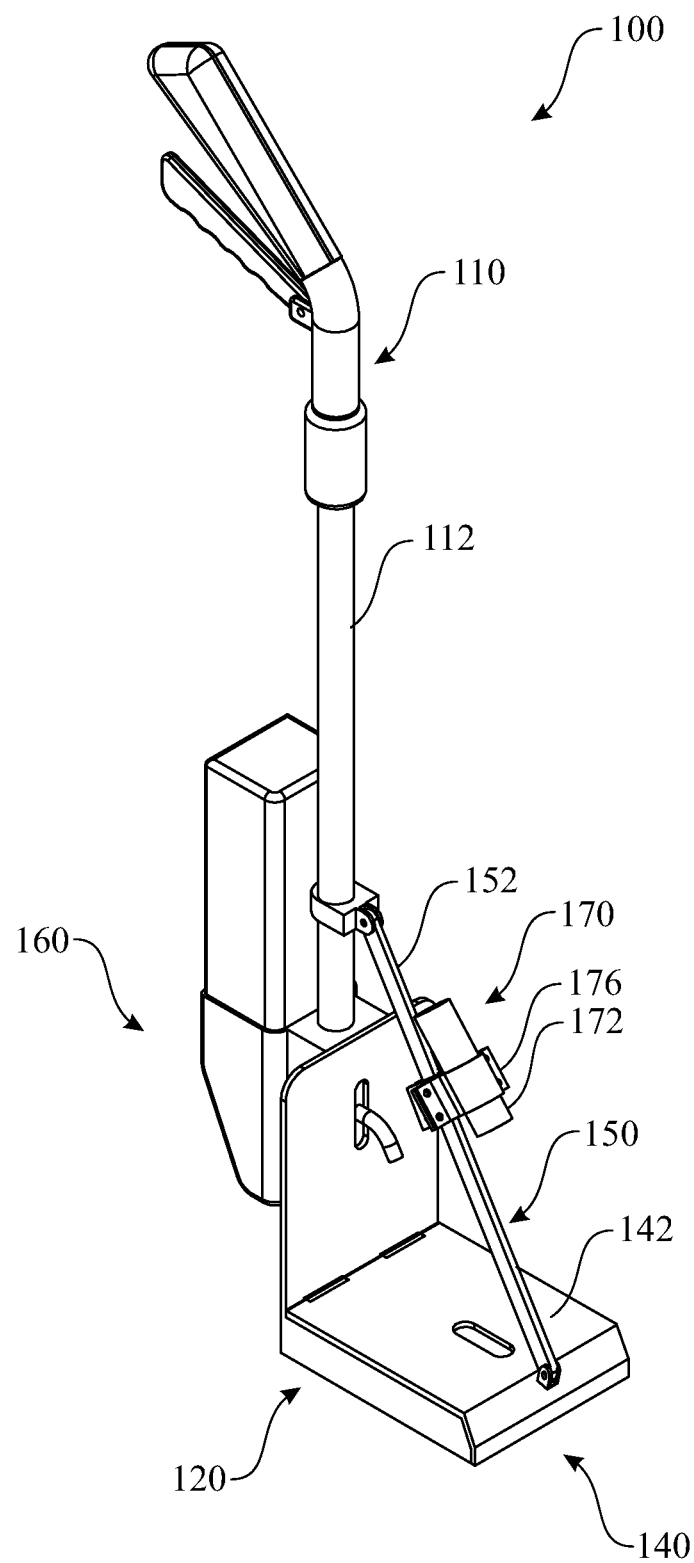
FIG. 8 presents a front perspective view of a further illustrative embodiment of a hygienic self-cleaning animal dropping collection and transfer device having an illumination assembly operatively mounted thereto and showing a cover assembly disposed in a closed transfer configuration, in accordance with the present invention.

Referring initially to the further illustrative embodiment of FIG. 8, a front perspective view of a hygienic self-cleaning animal dropping collection and transfer device 100 in accordance with the present invention is presented. As shown in the further illustrative embodiment of FIG. 8, and similar to the illustrative embodiment of FIGS. 1 through 7, the present hygienic self-cleaning animal dropping collection and transfer device 100 includes a support assembly 110 having a support member 112 onto which the various components which comprise the device 100 are cooperatively mounted.

Figure 9:
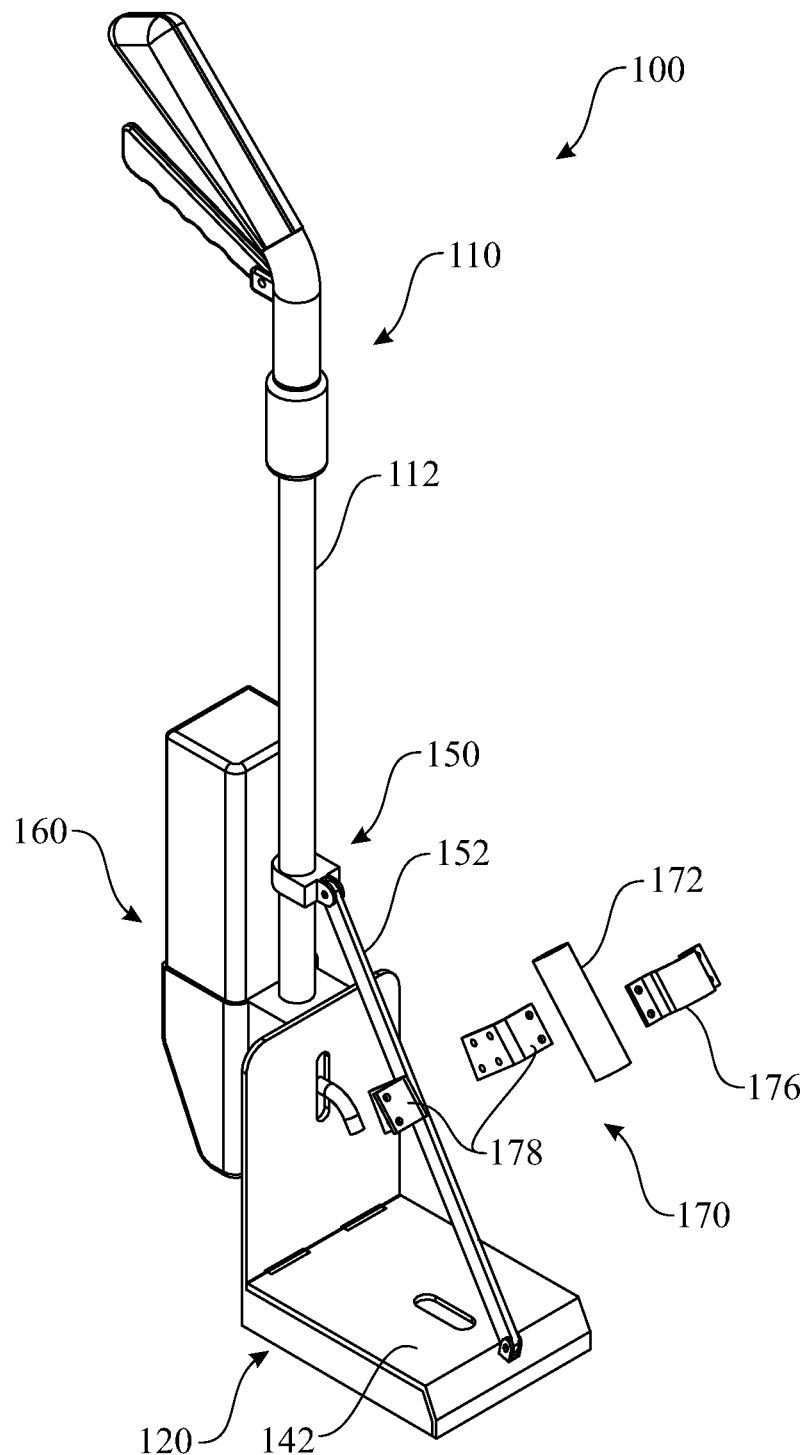
FIG. 9 presents a partially exploded front perspective view of the further illustrative embodiment of the hygienic self-cleaning animal dropping collection and transfer device of FIG. 8, in accordance with the present invention.
Figure 10:
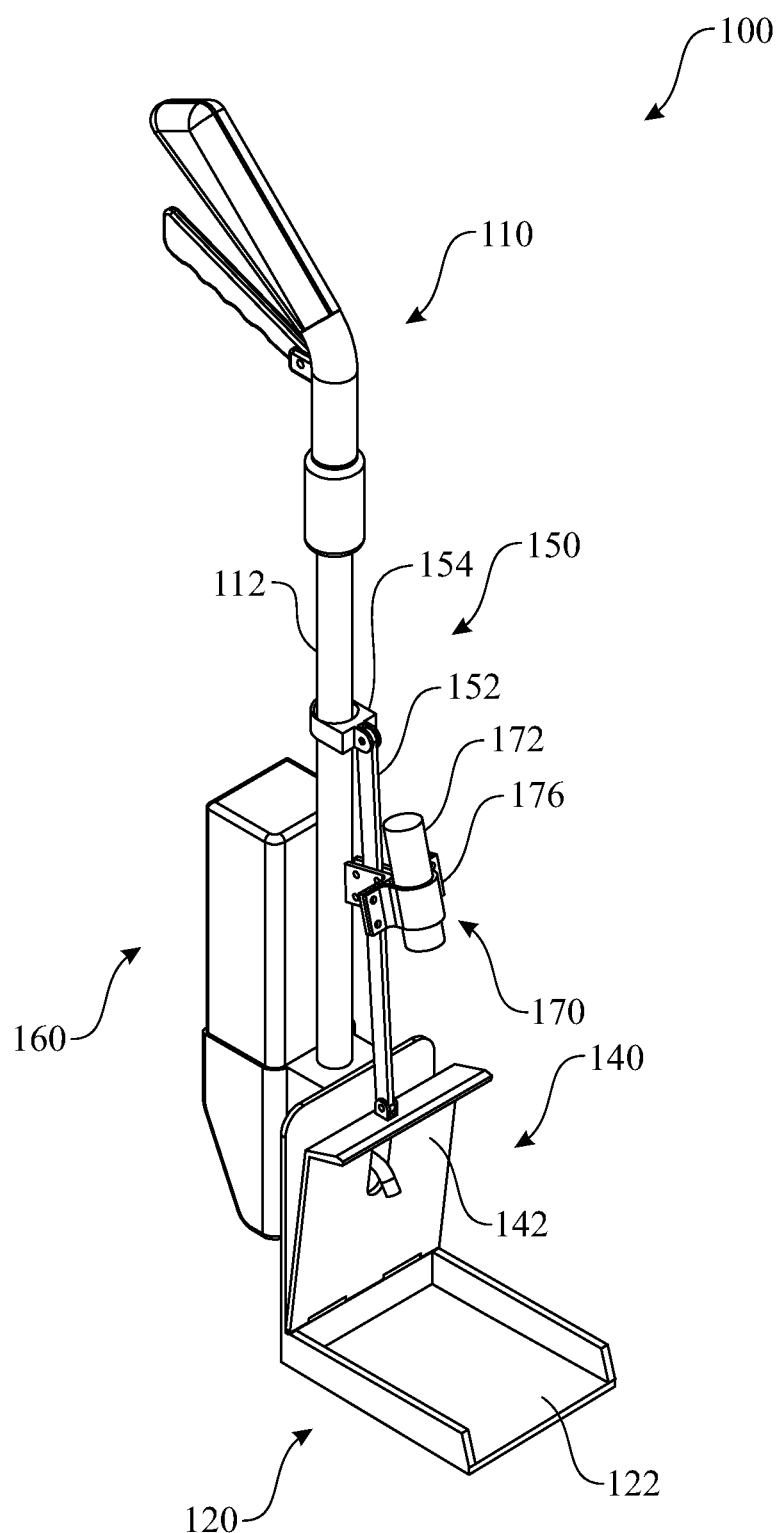
FIG. 10 presents a front perspective view of the further illustrative embodiment of the hygienic self-cleaning animal dropping collection and transfer device of FIG. 8 showing a cover assembly disposed in an open collection configuration, in accordance with the present invention.
Figure 11:
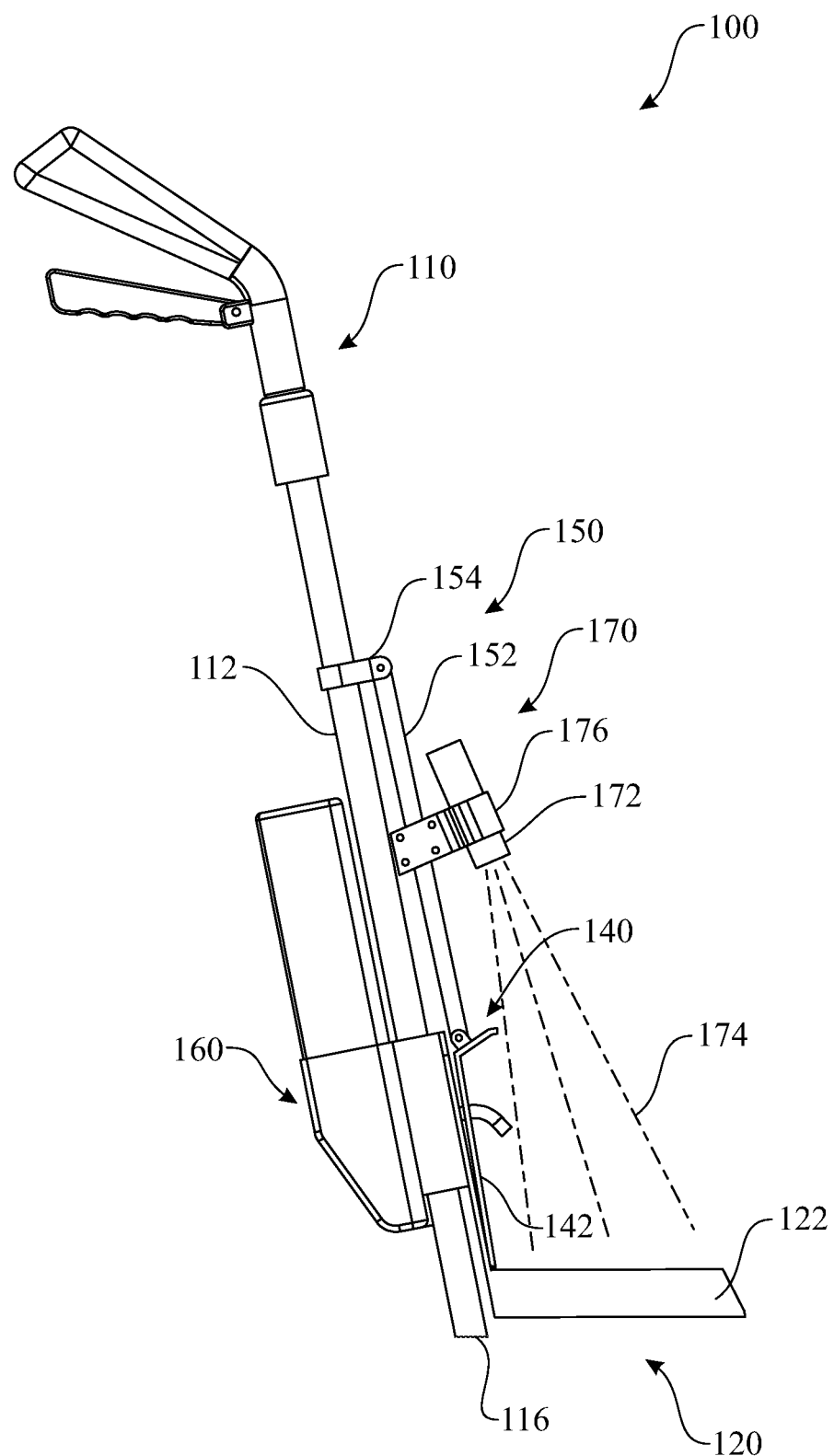
FIG. 11 presents a side elevation of the further illustrative embodiment of the hygienic self-cleaning animal dropping collection and transfer device of FIG. 8 showing the light assembly illuminating at least a collection tray, in accordance with the present invention.

More in particular, and with continued reference to the illustrative embodiment of FIG. 8, a hygienic self-cleaning animal dropping collection and transfer device 100 includes a collection assembly 120 positioned at a lower portion thereof. As further shown in the figures, the present device 100 includes a cover assembly 140 which is movable relative to at least a portion of the collection assembly 120. As before, a cover assembly 140 in accordance with one embodiment of the present invention includes a cover member 142 disposable between an open collection orientation, as shown in FIGS. 10 and 11, and a closed transfer orientation, as shown in FIGS. 8 and 9, and as was discussed in detail above with reference to FIGS. 1 through 7. As may also be seen from the further illustrative embodiment of FIG. 8, a hygienic self-cleaning animal dropping collection and transfer device 100 in accordance with the present invention also includes a positioning assembly 150. As before, a positioning assembly 150 includes a positioning member 152 operable via an actuator 154 and is provided to facilitate disposition of a cover member 142 of a cover assembly 140 between an open collection orientation and a closed transfer orientation, once again, as was discussed in detail above.

A hygienic self-cleaning animal dropping collection and transfer device 100 in accordance with the present invention further comprises a dispenser assembly 160, as is shown in the further illustrative embodiment of FIGS. 8 through 11. In at least one embodiment, a dispenser assembly 160 is operable to dispense an amount of a cleaning fluid onto at least a portion of the collection assembly 120, once again, as was discussed in detail above with reference to the illustrative embodiment of FIGS. 1 through 7.

In at least one embodiment, and as stated above, a hygienic self-cleaning animal dropping collection and transfer device 100 includes an illumination assembly 170 operably mounted thereto. In at least one embodiment, an illumination assembly 170 comprises an illumination unit 172 which may be turned on as needed to provide an illumination beam 174 proximate the present device 100, so as to facilitate use of the present device 100 in low lighting conditions, for example, while walking a pet at night. In at least one further embodiment, an illumination unit 172 may comprise a high power battery operated flashlight, such as, a high power battery operated LED flashlight.

With reference once again to the further illustrative embodiment of FIG. 8, an illumination assembly 170 is operatively mounted to a portion of a positioning member 152 of a position assembly 150. As such, the illumination unit 172 of the illumination assembly 170 is movable into an operative illumination orientation relative to at least a collection tray 122 of a collection assembly 120 when the positioning member 152 is actuated to dispose a cover member 142 of a cover assembly 140 into an open collection orientation, such as is shown best in the further illustrative embodiment of FIGS. 10 and 11.

As also shown in the further illustrative embodiment of FIG. 11, when an illumination unit 172 of an illumination assembly 170 is disposed in an operative illumination orientation relative to a collection tray 122 of a collection assembly 120, the illumination beam 174 generated by and transmitted therefrom is at least sufficient to substantially if not fully illuminate at least the collection tray 122 of the collection assembly 120, once again, so as to facilitate use of the present device 100 in low light conditions.

In at least one embodiment, an illumination assembly 172 is operatively mounted to a hygienic self-cleaning animal dropping collection and transfer device 100 in accordance with the present invention via a mount unit 176. A mount unit 176 in at least one embodiment includes a positioning member mount 178 and an illumination unit mount 179. With reference to the further illustrative embodiment of FIG. 9, a mount unit 176 in at least one embodiment includes a plurality of positioning member mounts 176 cooperatively structured and dimensioned to attach to a portion of a positioning member 152 of a positioning assembly 150. Further, an illumination member mount 179 is cooperatively structured to secure an illumination unit 172 to a positioning member 152 via interconnection to the plurality of positioning member mounts 178, as may be seen throughout the illustrative embodiment of FIGS. 8 through 11.

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A hygienic self-cleaning animal dropping collection and transfer device to collect and transfer an animal's droppings without requiring a user to bend down and/or pick up the animal droppings to place them into a plastic bag or other container for disposal, said device comprising:
   a support assembly having a support member;
   a collection assembly mounted to a lower portion of said support member having a collection tray with an open end along one side;
   a cover assembly having a cover member disposable between an open collection orientation and a closed transfer orientation relative to said collection assembly;
   a dispenser assembly having a reservoir mounted to said support assembly for containing an amount of a cleaning fluid therein; and
   said dispenser assembly further comprises a dispenser nozzle operable to dispense an amount of the cleaning fluid from said reservoir onto said collection tray of said collection assembly.

2. The collection and transfer device as recited in claim 1, wherein said support member of said support assembly includes a handle disposed on one end.

3. The collection and transfer device as recited in claim 2, wherein support assembly comprises a foot disposed opposite said handle to facilitate maintaining said collection tray in an operative position under a rear portion of the animal to collect the animal's droppings thereon.

4. The collection and transfer device as recited in claim 1, wherein said collection tray is dimensioned to be positioned in an operative position under a rear portion of the animal to collect the animal's droppings thereon.

5. The collection and transfer device as recited in claim 1, wherein said collection tray is constructed of stainless steel.

6. The collection and transfer device as recited in claim 1, wherein said collection tray is constructed of mirror polished stainless steel.

7. The collection and transfer device as recited in claim 1 further comprising a positioning assembly structured and disposed to facilitate disposition of said cover member between said open collection orientation and said closed transfer orientation relative to said collection assembly.

8. The collection and transfer device as recited in claim 7, wherein said positioning assembly comprises a positioning member interconnected to at least a portion of said cover assembly.

9. The collection and transfer device as recited in claim 8, wherein said positioning assembly further comprises an actuator interconnected to said positioning member.

10. The collection and transfer device as recited in claim 9, wherein said actuator is further movable interconnected to a portion of said support member.

11. The collection and transfer device as recited in claim 9, wherein said actuator is operable to cause said positioning member to move said cover member between said open collection orientation and said closed transfer orientation relative to said collection assembly.

12. The collection and transfer device as recited in claim 1, wherein said dispensing assembly includes a reservoir mount such that said reservoir may be securely affixed to a portion of said support assembly.

13. The collection and transfer device as recited in claim 1, wherein said dispenser assembly comprises a trigger, said dispenser assembly operable to dispense an amount of a cleaning fluid from said reservoir onto at least a portion of said collection tray upon operation of said trigger.

14. The collection and transfer device as recited in claim 1, wherein said collection assembly comprises a back wall having a back slot therethrough wherein said back slot is dimensioned and configured such that at least a portion of said dispenser nozzle is operatively positioned therethrough.

15. The collection and transfer device as recited in claim 1, wherein said collection assembly includes a plurality of oppositely disposed sidewalls each having a sloped edge adjacent an open end thereof.

16. The collection and transfer device as recited in claim 15, wherein said cover assembly includes a sloped portion cooperatively structured to substantially align with said sloped edges of said collection assembly such that while said cover member is disposed in said closed transfer orientation, said open end of said collection assembly is substantially enclosed thereby securely retaining the animal droppings therein for transfer to a final disposal location.

17. The collection and transfer device as recited in claim 1, wherein said cover member comprises a cover slot dimensioned and disposed such that at least a portion of said dispenser nozzle is operatively positioned therethrough while said cover member is disposed in said open collection orientation.

18. A hygienic self-cleaning animal dropping collection and transfer device to collect and transfer an animal's droppings without requiring a user to bend down and/or pick up the animal droppings to place them into a plastic bag or other container for disposal, said device comprising:
- a support assembly having a support member comprising a handle disposed on one end;
- a collection assembly mounted to a lower portion of said support member having a collection tray with an open end along one side, said collection tray is dimensioned to be positioned in an operative position under a rear portion of the animal to collect the animal's droppings thereon;
- a cover assembly having a cover member disposable between an open collection orientation and a closed transfer orientation relative to said collection assembly;
- a positioning assembly structured and disposed to facilitate disposition of said cover member between said open collection orientation and said closed transfer orientation relative to said collection assembly;
- a dispenser assembly having a reservoir mounted to said support assembly for containing an amount of a cleaning fluid therein; and
- said dispenser assembly further comprises a dispenser nozzle operable to dispense an amount of the cleaning fluid from said reservoir onto said collection tray of said collection assembly.

19. The collection and transfer device as recited in claim 18 further comprising an illumination assembly having an illumination unit operatively mounted to a portion thereof in an operative illumination orientation relative to said collection tray.

20. A hygienic self-cleaning animal dropping collection and transfer device to collect and transfer an animal's droppings without requiring a user to bend down and/or pick up the animal droppings to place them into a plastic bag or other container for disposal, said device comprising:
- a support assembly having a support member comprising a handle disposed on one end;
- a collection assembly mounted to a lower portion of said support member having a collection tray with an open end along one side, said collection tray is dimensioned to be positioned in an operative position under a rear portion of the animal to collect the animal's droppings thereon;
- a cover assembly having a cover member disposable between an open collection orientation and a closed transfer orientation relative to said collection assembly;
- a positioning assembly structured and disposed to facilitate disposition of said cover member between said open collection orientation and said closed transfer orientation relative to said collection assembly;
- a dispenser assembly having a reservoir mounted to said support assembly for containing an amount of a cleaning fluid therein;
- said dispenser assembly further comprises a dispenser nozzle operable to dispense an amount of the cleaning fluid from said reservoir onto said collection tray of said collection assembly;
- said dispenser assembly comprises a trigger, wherein said dispenser assembly is operable to dispense an amount of a cleaning fluid from said reservoir onto at least a portion of said collection tray upon operation of said trigger; and
- an illumination assembly having an illumination unit operatively mounted to a portion thereof in an operative illumination orientation relative to said collection tray.

* * * * *